United States Patent Office 3,300,612
Patented Jan. 24, 1967

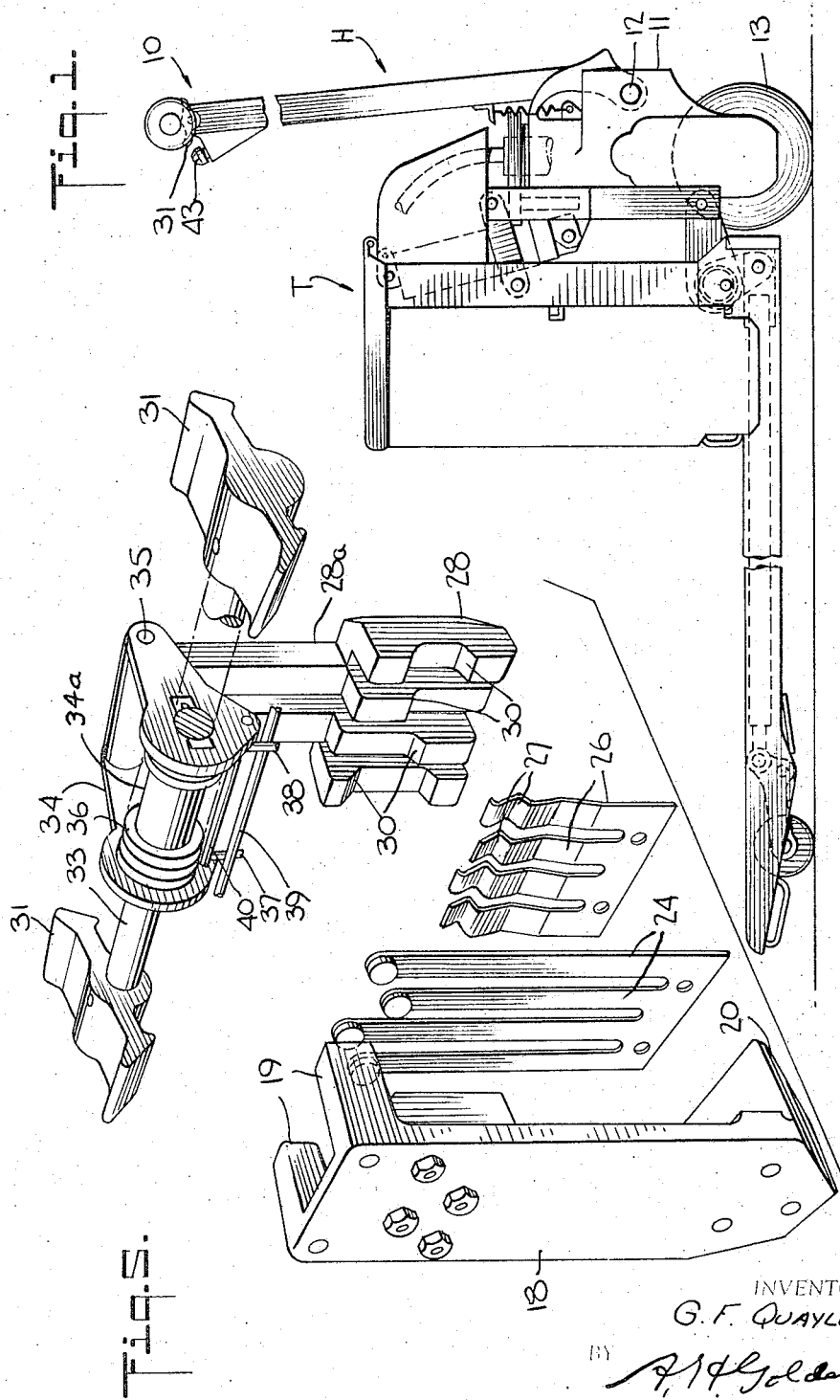

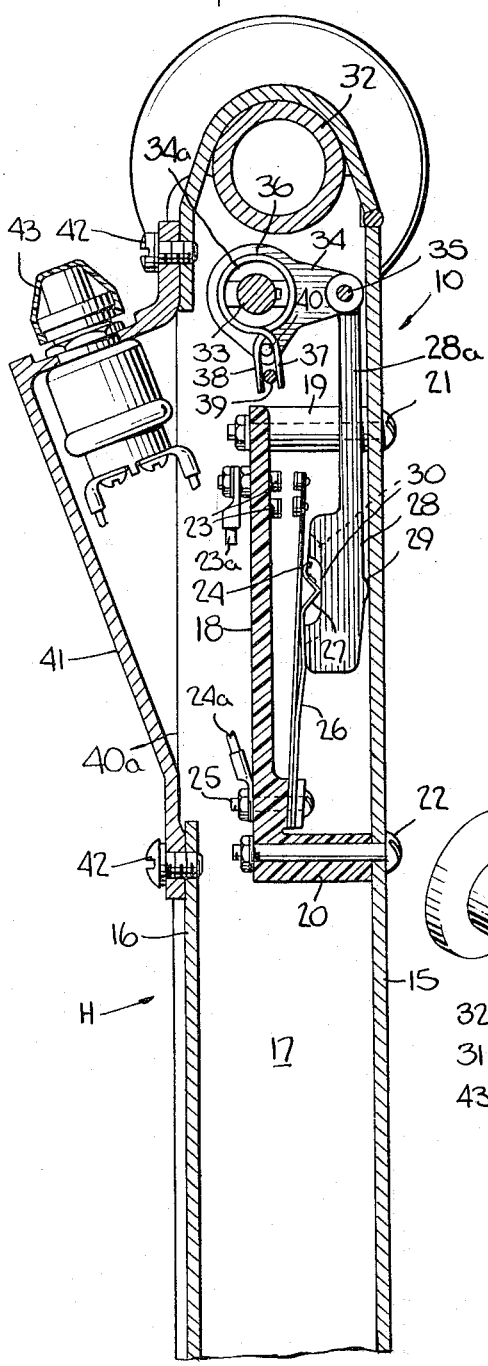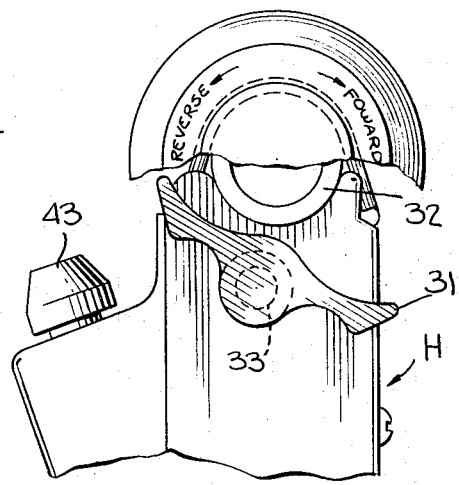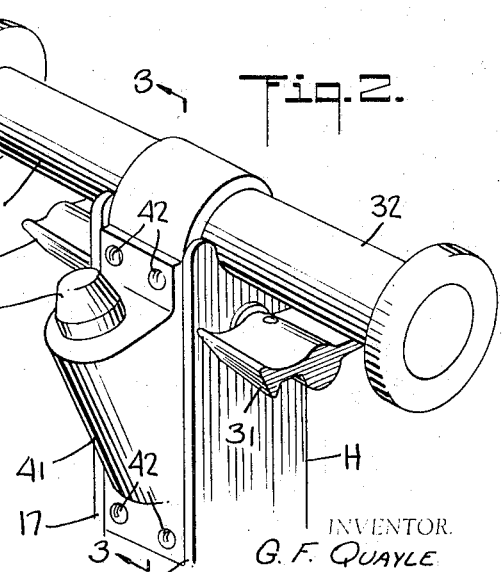

3,300,612
HANDLE MOUNTED CONTROLLER ASSEMBLY FOR MOTORIZED HAND TRUCK
George F. Quayle, Philadelphia, Pa., assignor to Eaton Yale & Towne, Inc., a corporation of Ohio
Filed Aug. 17, 1964, Ser. No. 390,071
7 Claims. (Cl. 200—157)

This invention relates to industrial trucks, and more particularly to a novel controller for the motor of a motorized hand truck. Those persons skilled in the art will appreciate that the trucks of the particular class are equipped with a controller which is mounted on the steering handle of the truck, so that the operator may easily control the traction motor of the truck while utilizing the handle to steer the truck. As an example, the patent to Schroeder, No. 2,401,113, shows a controller having switch contacts that are mounted on a steering handle, and that are actuated through a fingerpiece which is mounted in position juxtaposed to a hand grip forming a part of the handle. I have now conceived by my invention a controller and steering handle assembly having an exceedingly novel and ingenious construction that will operate extremely well, while actually being quite simple.

As a feature of my invention, I control switch contacts through a controller cam having one face that merely slides in a longitudinal direction on an inner surface of a hollow steering handle. The opposed face of the cam has cam surfaces that will actuate the controller contacts, there being spring means that hold the cam in sliding engagement with the handle surface so that the cam surfaces will move in the proper relation to the contacts.

As another feature, I utilize more or less conventional switch contact fingers, together with spring fingers through which the surfaces of a controller cam will act to move the contact fingers. The spring fingers are particularly arranged to press against the cam surfaces, so that the spring pressure will enable the operator to sense rather easily the actuation of the contacts. As a further feature of this part of my invention, I utilize a centering spring that acts with a more or less uniform pressure to press the controller cam toward neutral position. Preferably, the centering spring is a torsion spring on a fingerpiece shaft that moves the controller cam. While pressing the fingerpiece shaft to neutral position, the centering spring also will allow the pressure of the spring fingers to be felt through the fingerpiece, indicating to the operator the actuation of the controller contacts.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawings,

FIG. 1 shows a motorized hand truck utilizing my novel controller assembly;

FIG. 2 shows a perspective view of an end portion of the handle on which my controller is mounted;

FIG. 3 is a longitudinal section on the line 3—3 in FIG. 2;

FIG. 4 is a side view showing the fingerpiece in an actuated position; and

FIG. 5 is an exploded view showing parts of my controller.

Referring now more particularly to FIG. 1 of the drawings, I show a motorized hand truck T having a steering handle H that is equipped with my novel controller assembly, indicated generally by the numeral 10. The truck T has at its front end a usual type of steering and traction unit 11 on which the steering handle H is mounted through through a pivot 12, and including a wheel 13 driven by a traction motor, not shown. The operator will utilize the controller 10 to control the traction motor through suitable electric circuits, and may swing the steering handle H vertically about its pivot 12 to an operating position, in which he may move the handle H horizontally to rotate the steering and traction unit 11 and its wheel 13 on a stering mounting, as will be understood.

To describe the construction of my novel controller assembly 10, I shall refer first to FIG. 3 of the drawings. The steering handle H has a hollow box-like section with front and rear flat walls 15, 16 and opposed side walls 17. In a longitudinally extending position within the handle H, I mount a contact panel 18 which is formed from insulating material. As shown, the contact panel 18 has at its upper end a pair of legs 19, FIG. 5, and at its lower end a leg 20 that rests against the inner surface of the front wall 15 of the handle H. Screws 21, 22 are engaged in openings in panel 18 and wall 15 so as to mount the contact panel 18 in a particular spaced relation to the inner surface of wall 15.

A series of fixed contacts 23 are mounted in staggered relation on an upper portion of the contact panel 18, and a series of more or less conventional switch contact fingers 24 is mounted on a lower portion of panel 18, as by screws 25. The contact fingers 24 are staggered in length, and are so arranged as to extend longitudinally into opposed relation to contacts 23 in the space between the panel 18 and wall 15, but normally lie in an open circuit position relatively to contacts 23. As may be seen in FIG. 5, the contact fingers 24 are integrally formed relatively to one another, but that actually is not important to an understanding of my invention since it is conceivable that each contact finger may be a separate finger. The contacts 23 and fingers 24 will be connected through wires 23a, 24a to motor control circuits, as will be understood.

Referring to FIG. 3, each contact finger 24 rests against a spring finger 26 that is mounted on the contact panel 18. The fingers 26 may very well be mounted through the same screws 25 that hold the contact fingers 24. As best seen in FIG. 5, alternate spring fingers 26 are relatively long, those being the fingers that coact with the longer contact fingers 24. Each spring finger 26 is formed with a bent end portion 27 that acts with substantial pressure against a controller cam 28, so as to operate in a manner that I shall describe.

The controller cam 28 is a block-like member arranged in the space between the contact panel 18 and the wall 15 of the handle, and has on one face a bearing lug 29, FIG. 3, that is adapted to slide longitudinally on inner surface of the wall 15. An opposed face of cam 28 is formed with a series of cam surfaces 30, best seen in FIG. 5, that are engaged by the end portions 27 of the spring fingers 26. Cam 28 further has an operating stem portion 28a extending upwardly beyond the legs 19 of panel 18.

I have referred to the substantial spring pressure that is applied through the end portions 27 of the fingers 26, and I call attention here to the fact that this spring pressure will hold the controller cam 28 with its lug 29 against the wall 15 of the handle H. Thus, I utilize relatively simple means for holding the cam 28 in sliding engagement with the inner surface of wall 15, acting very effectively to guide cam 28 in particular relation to the panel 18 and its contacts.

When the controller cam 28 slides on the wall 15, the cam surfaces 30 will depress one or more of the spring fingers 26, those fingers yielding toward the left as viewed in FIG. 3 and thereby moving the corresponding contact fingers 24 to circuit closing position against fixed contacts 23. The controller cam 28 is shown in a neutral position in FIG. 3, certain of the cam surfaces 30 being effective when cam 28 slides upwardly or downwardly from neutral position whereby to contribute directional motor control. I believe it will be unnecessary to describe the arrangement of the cam surfaces 30 in detail, because a person skilled in the art will know how to arrange those surfaces to achieve the controller sequence that is desired.

As best shown in FIG. 2, I utilize a pair of fingerpieces 31 that are arranged like those in the Schroeder patent, being placed at opposed sides of the steering handle H near a transverse hand grip 32 fixed on the outer end of the handle. The fingerpieces 31 are secured to the ends of a rotatable fingerpiece shaft 33, FIGS. 3 and 5, that is mounted in a transverse axis extending through the interior of the steering handle H. A lever assembly 34 is keyed to the shaft 33 within the handle H, and is connected through a pivot 35 to the stem portion 28a of the controller cam 28. In the construction that I prefer, lever assembly 34 includes a sleeve 34a to which opposed end portions of the assembly are keyed, and which in turn is keyed to the shaft 33. Thereby the operator of the truck may utilize one of the fingerpieces 31 to slide the controller cam 28 in either direction from its neutral position.

I mount a coil torsion spring 36 in position about the sleeve 34a between the end portions of the lever assembly 34, the spring 36 having opposed end portions 37, 38 that extend radially. A stop pin 39 is mounted on the side walls 17 of the steering handle H, and engages between the ends 37, 38 of spring 36 so as to limit their rotation in opposed directions. Similarly, a stop pin 40 on the lever assembly 34 engages between the spring ends 37, 38 for rotating them in opposed directions. Thereby, the torsion spring 36 acts through the lever assembly 34 with a centering effect that presses the fingerpieces 31 and controller cam 28 toward neutral position. Spring 36 naturally will yield when the operator utilizes a finger piece 31 to slide the controller cam 28 in either direction. However, the pressure of spring 36 will be nearly uniform, and will not change to any great extent as the fingerpieces 31 rotate relatively to neutral position.

It will be remembered that the spring fingers 26 apply substantial pressure to the controller cam 28. That pressure will act in a direction to oppose or to assist the sliding of cam 28 whenever a cam surface 30 effects movement of a spring end portion 27. Thus, it may be said that the pressures of the spring fingers 26 are superposed on the relatively uniform pressure of the centering torsion spring 36, so that the operator may easily sense through the fingerpieces 31 the action of the contact fingers 24.

As best seen in FIG. 3, the rear wall 16 of the steering handle H is formed with an opening 40a that allows easy access for assembling or servicing the controller within the handle, should that be necessary. The opening 40a may be equipped with an angular cover 41 that is secured by screws 42, and that will support a further switch 43 for controlling particular power means such as lifting mechanism on the truck.

I believe that the construction and operation of my novel steering handle and controller assembly will now be understood. I contribute a controller that actually is quite simple, but that will operate extremely well on a motorized hand truck, enabling an operator to control the traction motor of the truck easily and to very good effect. I believe, therefore, that the merits of my invention will be fully appreciated by those skilled in the art.

I now claim:

1. A controller assembly for an elongated steering handle on a motorized hand truck, said handle comprising longitudinally extending walls that form a narrow chamber within said handle, a fingerpiece mounted for movement on an end portion of said elongated handle, a contact panel arranged in a longitudinally displaced relation to said fingerpiece in said narrow chamber, said panel being equipped with movable switch contacts, means mounting said panel and its contacts in a spaced relation to the inner surface of a wall of said chamber, a cam extending longitudinally in the space between said wall of the narrow chamber and said panel and in sliding engagement with said wall, said cam having portions for moving the switch contacts on the panel, and means connected to the fingerpiece and movable in the narrow chamber of the handle for sliding said cam when said fingerpiece is actuated.

2. A construction as set forth in claim 1 in which said means mounting the contact panel include spacer means engaging said wall of the narrow chamber, and fastening means coacting with said spacer means to hold the contact panel in a predetermined position relatively to said wall, said construction further including spring means acting between the cam and the contact panel to hold said cam against said wall of the chamber.

3. A construction as set forth in claim 1 in which said cam has a stem portion extending in said narrow chamber at said end portion of the steering handle and coacting with said means that are connected to the fingerpiece.

4. A controller assembly for an elongated steering handle on a motorized hand truck, said handle comprising walls that form a longitudinally extending narrow chamber within said handle, a fingerpiece shaft mounted to rotate on an end portion of the handle, a part of said shaft extending transversely in said narrow chamber, a contact panel arranged in longitudinally displaced relation to said part of the fingerpiece shaft in said narrow chamber, said panel being equipped with movable switch contacts, means mounting said panel and its contacts in a spaced relation to the inner surface of a wall of said narrow chamber, a switch actuating cam in the space between said panel and said wall and having a surface in sliding engagement with said wall, portions of said cam actuating the switch contacts when said cam slides, a lever fixed to the fingerpiece shaft within the narrow chamber, and means connecting said lever to said cam so that said lever when rotated by the fingerpiece shaft will slide the cam in guided relation to the wall and the switch contacts.

5. A construction as set forth in claim 4 in which said means that connect said lever to said cam include a pivot engaged between said lever and one end portion of the cam and acting together with said wall of the chamber to guide the cam relatively to the contact panel.

6. A construction as set forth in claim 4 in which said cam is slideable in opposed directions relatively to a neutral position on said wall of the chamber for actuating opposed directional switch contacts, and including a centering spring coacting with the rotatable fingerpiece shaft in the narrow chamber whereby to act through the shaft and lever to press said cam toward its neutral position.

7. A construction as set forth in claim 4 in which said cam has a stem portion extending in said narrow chamber toward said end portion of the steering handle, and said connecting means including a pivot engaged between said lever and said stem portion and acting together with said wall of the chamber to guide the cam relatively to the contact panel.

(References on following page)

References Cited by the Examiner

UNITED STATES PATENTS

| | | | |
|---|---|---|---|
| 1,149,755 | 8/1915 | Hart | 200—153 |
| 2,020,733 | 11/1935 | Moehler | 200—153 X |
| 3,135,839 | 6/1964 | Colautti et al. | 200—5 |

FOREIGN PATENTS 1,015,096  9/1957  Germany.

ROBERT K. SCHAEFER, *Primary Examiner.*
KATHLEEN H. CLAFFY, *Examiner.*
H. HOHAUSER, *Assistant Examiner.*